US012594678B2

(12) United States Patent
Auer et al.

(10) Patent No.: US 12,594,678 B2
(45) Date of Patent: Apr. 7, 2026

(54) DEVICE AND METHOD FOR GRIPPING AN OBJECT

(71) Applicant: Bayerische Motoren Werke Aktiengesellschaft, Munich (DE)

(72) Inventors: Christian Auer, Pilsting (DE); Claus-Peter Baumann, Leiblfing (DE); Alois Dobler, Holzheim (DE); Martin Endres, Pfaffenhofen an der Ilm (DE); Reinhold Hackl, Regenstauf (DE); Franz Korber, Mallersdorf (DE); Martin Kuhn, Regenstauf (DE); Maximilian Rainer, Offenberg (DE); Markus Sieber, Bernhardswald (DE); Franz Stockner, Aholming (DE); Stefan Weinmann, Reisbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 980 days.

(21) Appl. No.: 17/782,068

(22) PCT Filed: Nov. 17, 2020

(86) PCT No.: PCT/EP2020/082375
§ 371 (c)(1),
(2) Date: Jun. 2, 2022

(87) PCT Pub. No.: WO2021/115736
PCT Pub. Date: Jun. 17, 2021

(65) Prior Publication Data
US 2023/0009079 A1      Jan. 12, 2023

(30) Foreign Application Priority Data
Dec. 11, 2019    (DE) ..................... 10 2019 133 867.0

(51) Int. Cl.
B25J 15/00 (2006.01)
B25J 15/10 (2006.01)
B65G 47/90 (2006.01)

(52) U.S. Cl.
CPC ......... B25J 15/0061 (2013.01); B25J 15/103 (2013.01); B65G 47/905 (2013.01)

(58) Field of Classification Search
CPC ...... B25J 15/0061; B25J 15/103; B25J 15/04; B65G 47/905; B65G 47/904
See application file for complete search history.

(56) References Cited

U.S. PATENT DOCUMENTS 8,291,566 B2 * 10/2012 Ushio .................... B25J 13/085
29/407.08
8,321,051 B2 * 11/2012 Ago ....................... B65G 59/04
414/626
(Continued)

FOREIGN PATENT DOCUMENTS

CN       104608141 A       5/2015
CN       206912785 U       1/2018
(Continued)

OTHER PUBLICATIONS

International Search Report (PCT/ISA/210) issued in PCT Application No. PCT/EP2020/082375 dated Mar. 2, 2021 with English translation (five (5) pages).
(Continued)

*Primary Examiner* — Stephen A Vu
(74) *Attorney, Agent, or Firm* — Crowell & Moring LLP

(57) ABSTRACT
A device for gripping an object includes a base element and at least two gripping arms held on the base element. The at least two gripping arms are movable relative to one another and the base element into a configuration suitable for gripping and picking up the object. Preferably at least three gripping arms are provided, with each arm being able to
(Continued)

move independently of one another relative to the base element, and a sensor such as a camera provides signals to electronics which can determine the position of the at least three gripping arms and control movement of the gripping arms into position to grip and pick up the object. A method for gripping and picking up an object using the gripping device is also provided.

11 Claims, 2 Drawing Sheets

(56) References Cited

U.S. PATENT DOCUMENTS

| | | | | |
|---|---|---|---|---|
| 8,523,255 | B2 * | 9/2013 | Fukano | B25B 11/007 |
| | | | | 294/64.2 |
| 9,334,128 | B2 * | 5/2016 | Milhau | B65G 47/917 |
| 9,546,050 | B2 * | 1/2017 | Kronsteiner | B65G 49/061 |
| 2001/0045755 | A1 | 11/2001 | Schick et al. | |
| 2015/0123416 | A1 | 5/2015 | Kitamura | |
| 2017/0081134 | A1 | 3/2017 | Aldazabal Badiola | |
| 2019/0176346 | A1 | 6/2019 | Ma et al. | |

FOREIGN PATENT DOCUMENTS

| | | | |
|---|---|---|---|
| CN | 108127683 | A | 6/2018 |
| DE | 256 231 | A3 | 5/1988 |
| DE | 10 2010 054 739 | A1 | 6/2012 |
| DE | 10 2018 007 932 | A1 | 4/2019 |
| DE | 10 2017 219 757 | A1 | 5/2019 |
| DE | 10 2018 106 812 | A1 | 9/2019 |
| JP | 5-208931 | A | 8/1993 |
| JP | 10-6266 | A | 1/1998 |

OTHER PUBLICATIONS

German-language Written Opinion (PCT/ISA/237) issued in PCT Application No. PCT/EP2020/082375 dated Mar. 2, 2021 (eight (8) pages).

German-language Search Report issued in German Application No. 10 2019 133 867.0 dated Oct. 27, 2020 with partial English translation (10 pages).

English translation of Chinese-language Office Action issued in Chinese Application No. 202080073380.5 dated Jul. 5, 2023 (6 pages).

English translation of Chinese Office Action issued in Chinese Application No. 202080073380.5 dated Feb. 15, 2023 (seven (7) pages).

* cited by examiner

DEVICE AND METHOD FOR GRIPPING AN OBJECT

BACKGROUND AND SUMMARY OF THE INVENTION

The invention relates to a device and a method for gripping an object according to the preambles of the independent claims.

A production facility for producing motor vehicles is already known from DE 10 2018 007 932 A1. A handling robot having at least one movable gripper is provided in this case. The gripper can be configured to take a gripping tool specific for a certain motor vehicle part from a magazine. In this way, automatic refitting of the handling robot can be carried out in dependence on the respective motor vehicle part to be gripped.

The object of the present invention is to provide a device and a method for gripping an object, by means of which the object can be gripped particularly securely.

This object is achieved according to the invention by a device and a method for gripping an object having the features of the independent claims.

A first aspect of the invention relates to a device for gripping an object, having a base element and having at least two gripping arms held on the base element, by means of which the object can be picked up. The object is in particular a motor vehicle part. Alternatively, the object can be household appliance, which is also referred to as so-called white goods, or another object. To pick up the object, the gripping arms are designed to be movable relative to the base element. Due to the movable design of the gripping arms, they can be applied to the respective object, by which object can be picked up. To enable the respective object to be picked up particularly securely, at least three gripping arms are provided according to the invention, which are each movable independently of one another relative to the base element. The independent mobility of the respective gripping arms relative to the base element particularly advantageously enables the gripping arms to be adaptable in their position relative to one another in relation to a respective external contour of the object to be gripped. The object to be picked up can be gripped particularly securely by means of the flexible device in this way.

In this context, it has proven to be particularly advantageous if the gripping arms are pivotable around respective assigned axes of rotation relative to the base element. In particular, a separate axis of rotation is assigned to each of the gripping arms here, around which the respective gripping arm is pivotable relative to the base element. The pivotability of the respective gripping arms around the respective assigned axes of rotation can be enabled via respective rotation units. For this purpose, each of the gripping arms can be held on the base element via a rotation unit specifying the respective axis of rotation. The ability to rotate the gripping arms around the axis of rotation relative to the base element enables particularly extensive different setting of the gripping arms, due to which the object to be picked up can be gripped particularly well on its external contour and is to be held particularly securely.

It has furthermore proven to be advantageous in this context if the axes of rotation are aligned in parallel to one another. This means that the gripping arms are pivotable in movement planes extending in parallel to one another, in particular in the same movement plane around the respective axes of rotation. In this way, a distance between the respective gripping arms, in particular between their respective ends facing away from the base element, can be set particularly advantageously, by which a particularly large degree of mobility of the device can be achieved.

In a further embodiment of the invention, it has proven to be advantageous if at least one of the gripping arms comprises a translation adjustment unit and a gripping element held on the translation adjustment unit, which is movable relative to the translation adjustment unit. In particular, the translation adjustment unit is designed as a rail. The translation adjustment unit extends with its longitudinal extension direction at least essentially perpendicular to the respective assigned axis of rotation of the gripping arm and is configured to move, in particular to traverse, the gripping element translationally along the longitudinal extension direction relative to the axis of rotation. The gripping element is held at least indirectly on the translation adjustment unit and is configured to pick up the object. The translation adjustment unit in turn enables a relative movement of the gripping element in relation to the base element, by which a distance is settable between the gripping element and the base element. At least one of the gripping arms is therefore formed in at least two parts, in particular multiple parts, wherein the individual parts of the gripping arm are movable relative to one another. In this way, a particularly advantageous mobility of the device can be achieved, which in turn enables particularly secure picking up and holding of the object.

It has proven to be particularly advantageous here if the gripping element is movable along the longitudinal extension direction of the translation adjustment unit. In this way, the gripping element can be set in its distance relative to the axis of rotation assigned to the gripping arm. Via the movement of the gripping element along the longitudinal extension direction of the translation adjustment unit, the gripping element can in particular be traversed in the movement plane in which the gripping arms are pivotable around the respective axes of rotation. The gripping element can be set in its position relative to the remaining gripping arms in this way. In particular, each of the gripping arms comprises the translation adjustment unit and the gripping element held on the translation adjustment unit, wherein the gripping elements are settable in their position relative to one another by movement along the translation adjustment unit and pivoting of the translation adjustment unit around the respective assigned axis of rotation. In this way, a particularly large degree of movement freedom of the gripping elements relative to one another can be provided, which results in particularly secure gripping of the object.

Alternatively or additionally, the gripping element is settable in its distance relative to the translation adjustment unit. It is provided in particular here that the gripping element is settable along a longitudinal extension direction of the assigned axis of rotation relative to the translation adjustment unit. The gripping element can be set here in parallel to the assigned axis of rotation of the gripping arm along the longitudinal extension direction of the axis of rotation relative to the translation adjustment unit. A particularly flexible mobility of the respective gripping elements relative to one another and in particular three-dimensionally in space is enabled in this way. A respective contact point at which the respective gripping element comes into contact with the object when gripping the object is therefore controllable particularly precisely and easily by means of the gripping element.

In a further embodiment of the invention, it is provided that the gripping element comprises a quick change unit, by means of which a gripping tool can be received via a quick-action closure. The gripping tool can be adapted to the respective object to be gripped. The quick change unit enables particularly simple and rapid receiving of the respective gripping tool or changing of the respective gripping tool, so that the device is adaptable particularly easily and quickly to the respective object to be picked up and gripped. The object can be held particularly securely via the gripping tools which can be received and which are adapted to the object to be gripped.

In a further embodiment of the invention, it has been shown to be advantageous if a detection unit is provided, by means of which the object to be gripped is detectable and a sensor signal characterizing the detected object can be provided for an electronic processing unit. Furthermore, the electronic processing unit is provided, by means of which a relative position of the object to be gripped relative to the gripping arms can be ascertained in dependence on the received sensor signal. Furthermore, an electronic control unit is provided, by means of which the gripping arms are movable relative to the object in dependence on the ascertained relative position. The device can therefore be moved particularly advantageously toward the object to be gripped and a respective position or alignment of the gripping arms relative to the object can be set in order to be able to pick up the object particularly securely and quickly. This detection unit, which is electronic in particular, comprises, for example, a camera unit, by means of which an image of the object is recordable, wherein the image is characterized by the sensor signal. On the basis of the sensor signal, the relative position of the device or the gripping arms in relation to the object to be gripped can be determined via the electronic processing unit by means of an electronic data set evaluation unit, in particular an image evaluation unit. By means of the control unit, a movement of the gripping arms or the gripping elements of the device relative to the object can be controlled or corrected in dependence on the ascertained relative position, whereby a particularly precise application of the gripping elements to the object is enabled.

In a further embodiment of the invention, a fastening unit is provided, by means of which the device is fastenable on a robot. Via the fastening unit, the device can be received by the robot, due to which the device is movable by means of the robot relative to the object. By means of the robot, the device is movable particularly flexibly relative to the object to ensure optimum picking up of the object by means of the device. This means that by means of the robot, the device can be moved toward the object, wherein by means of the control unit, the gripping arms of the device are movable relative to the object to pick up the object. The robot thus enables a particularly flexible arrangement of the device relative to the object, on the one hand, to enable picking up of the object by means of the device at all and, on the other hand, to ensure particularly advantageous gripping of the object by means of the device.

The second aspect of the invention relates to a method for gripping an object, in which at least two gripping arms held on the base element are moved relative to the base element to pick up the object. For particularly advantageous gripping of the object, it is provided that at least three gripping arms are each moved independently of one another relative to the base element. The method is configured to be carried out by a device as has already been described in conjunction with the device according to the invention. Advantages and advantageous refinements of the device according to the invention are to be viewed as advantages and advantageous refinements of the method according to the invention and vice versa. For this reason, the further advantages and advantageous refinements of the method according to the invention are not described once again here.

Further features of the invention result from the claims, the figures, and the description of the figures. The features and combinations of features mentioned above in the description and the features and combinations of features mentioned hereinafter in the description of the figures and/or solely shown in the figures are usable not only in the respective specified combination but also in other combinations or alone.

The invention will be explained in more detail on the basis of a preferred example embodiment and with reference to the drawings.

DETAILED DESCRIPTION

Identical elements are provided with identical reference signs in the figures.

Figure 1:
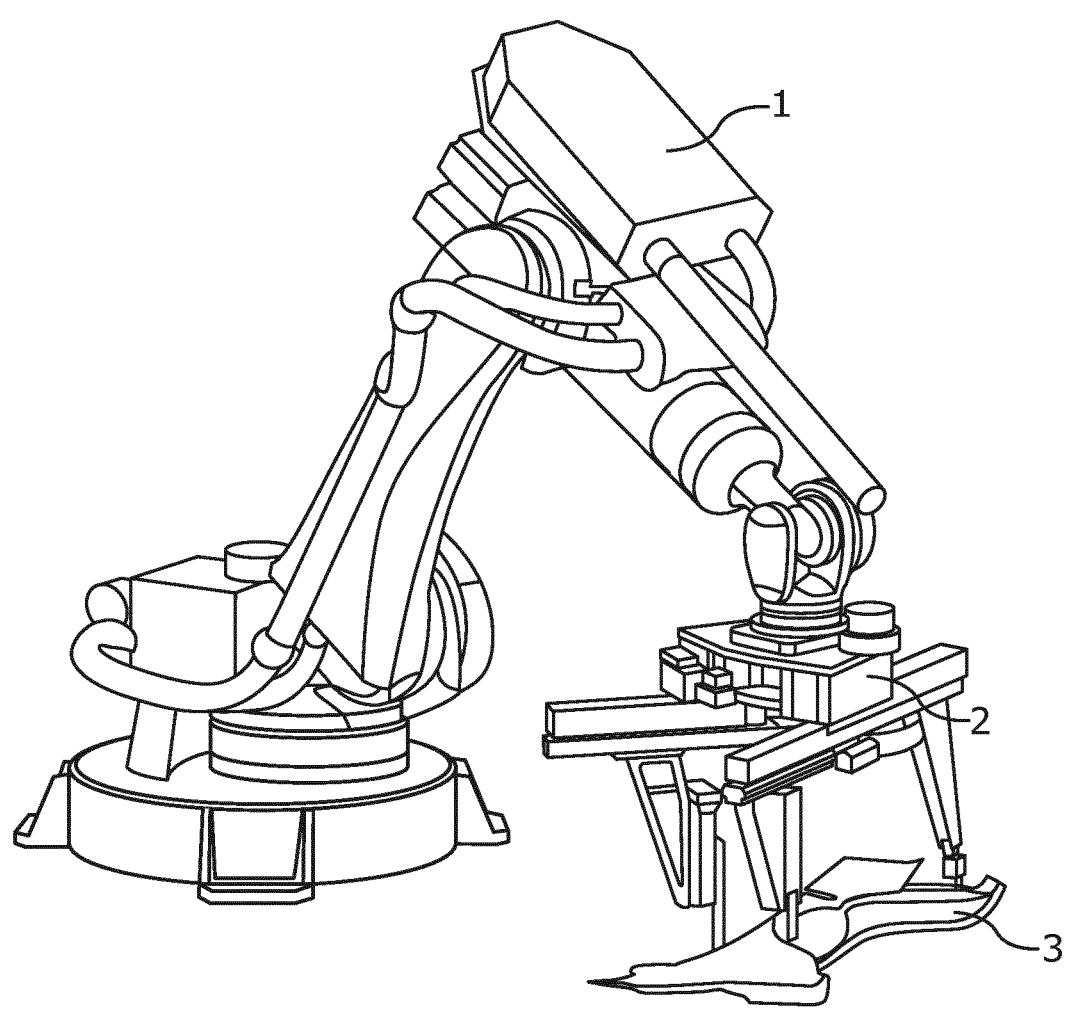
FIG. 1 shows a perspective view of a robot having a device in accordance with an embodiment of the present invention for gripping a motor vehicle part, by means of which the motor vehicle part is picked up and which is adaptable to the motor vehicle part.

A robot 1 is shown in FIG. 1, by means of which a device 2 for gripping an object is accommodated. In the following, the device 2 is described in conjunction with picking up a motor vehicle part 3 as the object. The device 2 is movable relative to the motor vehicle part 3 by means of the robot 1 to enable the device 2 to be applied to the motor vehicle part 3. The robot 1 can be used, for example, in a production facility for motor vehicles, in particular automobiles, wherein the motor vehicle part 3 is gripped by means of the device 2, the device 2 is moved by means of the robot 1, and subsequently the motor vehicle part 3 is released by means of the device 2, by which the motor vehicle part 3 is transportable from a first location to a second location.

Figure 2:
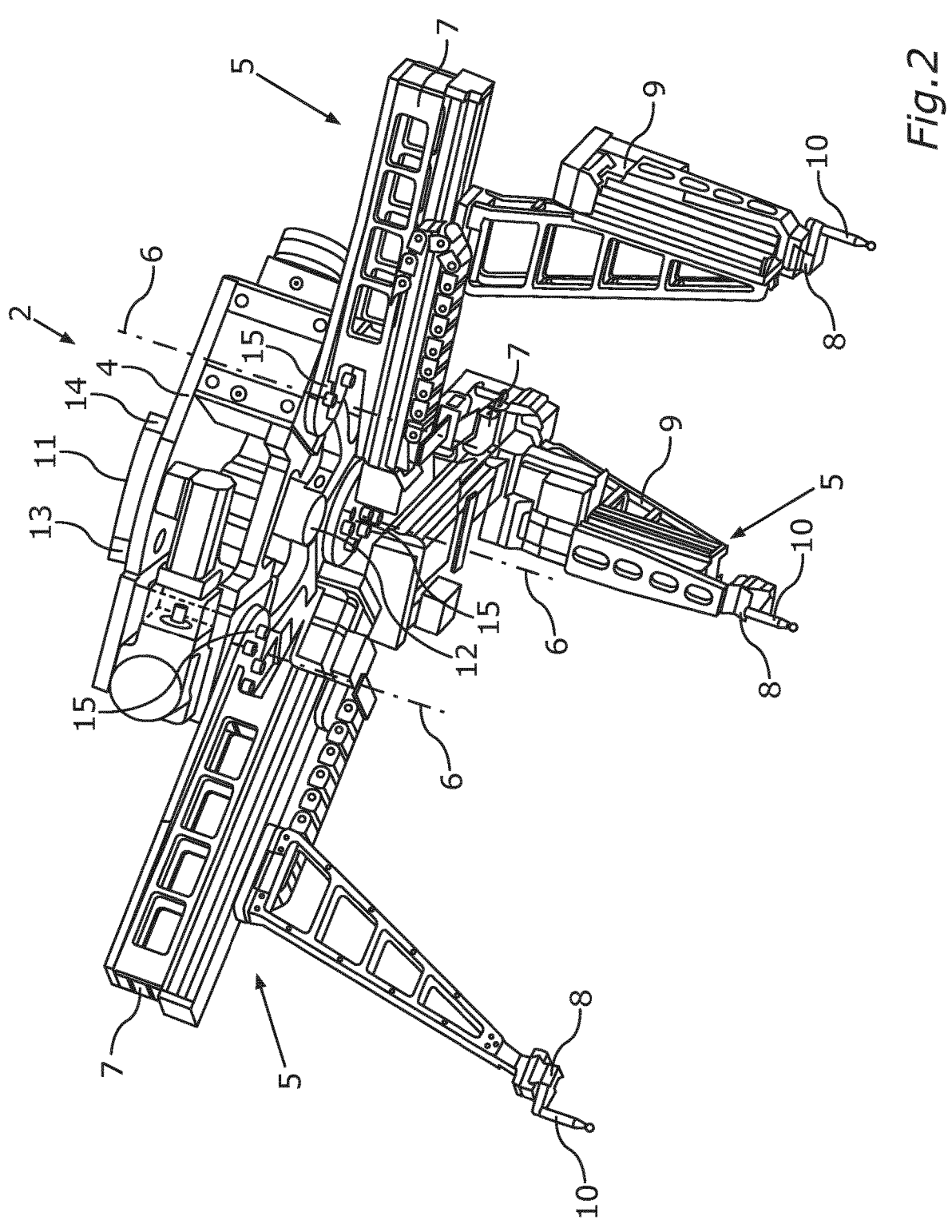
FIG. 2 shows a perspective view of the device of FIG. 1 for gripping the motor vehicle part having three gripping arms flexibly movable relative to one another, by means of which a respective gripping tool, by means of which the motor vehicle part can be gripped particularly securely, can be received via a respective quick-action closure of a quick change unit.

The device 2 is shown in more detail in FIG. 2. It can be recognized here that the device 2 comprises a base element 4 and three gripping arms 5 held on the base element 4. The gripping arms 5 are held on the base element 4 so they are movable relative to the base element 4. In the present case, the gripping arms 5 are pivotable around respective axes of rotation 6 aligned in parallel to one another independently of one another relative to the base element 4 in a shared movement plane. The device 2 comprises rotation units 15 assigned to the respective gripping arms 5, via which the gripping arms 5 are pivotable around the axes of rotation 6 relative to the base element 4. The rotation units 15 are respective turntables in the present case. In this way, the gripping arms 5 can be adjusted relative to one another in an optimum angle. In the present case, a separate axis of rotation 6 is assigned to each of the gripping arms 5. In an alternative embodiment (not shown), the axes of rotation 6 can coincide with one another.

In the present case, each of the gripping arms 5 comprises a translation adjustment unit, which in the present case is a rail 7, and a gripping element 8 held on the rail 7. The rails 7 extend in the present case perpendicularly to the respective axis of rotation 6. The rails 7 provide respective traversing axes for the gripping elements 8. This means that the respective gripping elements 8 are movable along a longitudinal extension direction of the respective rails 7 relative to the rails 7. In the present case, two of the three gripping arms 5 comprise a vertical adjustment unit 9, by means of which a distance between the respective gripping elements 8 and the associated rails 7 of the respective gripping arms 5 is settable. In the present case, an adjustment direction of the vertical adjustment unit 9 extends in parallel to the respective assigned axes of rotation 6 of the respective gripping arms 5. Via the respective vertical adjustment units 9, the gripping elements 8 can be moved toward the rail 7 or can be moved away from the respective assigned rail 7.

To be able to adapt the device 2 particularly advantageously to the respective motor vehicle part 3 to be picked up, the respective gripping elements 8 each comprise a quick change unit 10. The quick change unit 10 is configured to receive a gripping tool adapted to the respective motor vehicle part 3 to be picked up via a quick-action closure. Receiving the respective gripping tool adapted to the motor vehicle part 3 to be gripped enables particularly rapid and simple adaptation of the device 2 to the motor vehicle part 3 by a selection of the respective gripping tools assigned to the motor vehicle part 3.

To be able to receive the device 2 by means of the robot 1, the device 2 comprises a fastening unit 11, which is schematically identified in the present case by a box. The device 2 is fastenable on the robot 1 and is to be held on the robot 1 via the fastening unit 11. The fastening unit 11 thus enables particularly secure and simple fastening of the device 2 on the robot 1, so that the device 2 is movable relative to the motor vehicle part 3 to be gripped by means of the robot 1. The fastening unit 11 can be designed as an automatic docking system for an automated tool change on the robot 1.

To enable particularly precise gripping of the motor vehicle part 3 by means of the device 2, in the present case the device 2 comprises a detection unit 12. This detection unit 12 comprises a camera unit in the present case. The detection unit 12 enables positioning of the device 2 relative to the motor vehicle part 3 by means of a camera object recognition. An image of the motor vehicle part 3 is recordable by means of the camera unit. The detection unit 12 provides a sensor signal characterizing the image for an electronic processing unit 13 of the device 2. The received sensor signal can be evaluated by means of the electronic processing unit 13. As a result of the evaluation of the sensor signal, a relative position of the device 2, in particular of the gripping arms 5, relative to the motor vehicle part 3 can be ascertained. The electronic processing unit 13 provides the ascertained relative position for an electronic control unit 14 of the device 2. By means of the control unit 14, which is schematically identified like the electronic processing unit 13 by a box, the gripping arms 5 are movable relative to the base element 4. As a result of the reception of the relative position of the device 2 or the gripping arms 5 in relation to the motor vehicle part 3 to be gripped, the gripping arms 5 are moved by means of the electronic control unit 14 in dependence on the ascertained relative position in relation to the motor vehicle part 3 to be able to pick up the motor vehicle part 3 particularly precisely. In this case, during a movement of the gripping arms 5 relative to the base element 4 or relative to the motor vehicle part 3, the motor vehicle part 3 can be recorded repeatedly at regular intervals by means of the detection unit 12. This enables respective relative positions of the device 2 or the gripping arms 5 assigned to the recordings of the motor vehicle part 3 in relation to the motor vehicle part 3 to be able to be ascertained by means of the electronic processing unit 13. In dependence on the multiple ascertained relative positions, which have been ascertained relative to one another at time intervals, the movement of the gripping arms 5 relative to the motor vehicle part 3 can be adapted and thus corrected by means of the electronic control unit 14. In this way, the motor vehicle part 3 can be picked up particularly precisely by means of the device 2. Alternatively or additionally, the relative position of the device 2 or the gripping arms 5 in relation to the motor vehicle part 3 ascertained by means of the electronic processing unit 13 can be provided for a further electronic control unit, wherein the robot 1 is controllable by means of the further electronic control unit in order to align the device 2 relative to the motor vehicle part 3 in dependence on the ascertained relative position.

The described device 2 and the described method for gripping the motor vehicle part 3 by means of the device 2 is based on the knowledge that due to a high degree of automation in vehicle body construction, a variety of gripping systems is used to grip motor vehicle parts 3. Many of these gripping systems only have comparatively little flexibility. The device 2 creates an option of gripping a broad spectrum of motor vehicle parts 3, including assemblies in the vehicle construction, particularly advantageously. For this purpose, a three-dimensional movement of the gripping arms 5 relative to the respective motor vehicle part 3 to be gripped is possible by means of the device 2. This allows the motor vehicle component 3 to be able to be gripped independently of features or depending on features by means of the device 2.

Overall, the invention shows how a flexible gripping system having gripping arms 5 which can be particularly flexibly actuated three-dimensionally can be provided.

LIST OF REFERENCE NUMERALS

1 robot
2 device
3 motor vehicle part
4 base element
5 gripping arm
6 axis of rotation
7 rail
8 gripping element
9 vertical adjustment unit
10 quick change unit
11 fastening unit
12 detection unit
13 electronic processing unit
14 electronic control unit
15 rotation unit

What is claimed is:

1. A device for gripping an object, comprising:
a base element; and
at least three gripping arms provided on the base element,
   the at least three gripping arms being configured to hold the object to be picked up,
wherein the at least three gripping arms each are configured to be movable independently of one another relative to the base element,
wherein a first gripping arm of the at least three gripping arms incudes a translation adjustment unit, a gripping element held on the translation adjustment unit, and an adjustment unit, wherein the translation adjustment unit extends perpendicularly to an axis of rotation of the first gripping arm, and the gripping element is configured to be movable along a longitudinal extension direction of the translation adjustment unit, and wherein the gripping element is configured to be moved toward or away from the translation adjustment unit via the adjustment unit.

2. The device according to claim 1, wherein the gripping arms are pivotable around respective axes of rotation relative to the base element.

3. The device according to claim 2, wherein the axes of rotation are arranged in parallel to one another.

4. The device according to claim 1, wherein the translation adjustment unit extends radially outwardly from a circumference of the base element.

5. The device according to claim 1, wherein the gripping element is movable toward or away from the base element along the longitudinal extension direction of the translation adjustment unit.

6. The device according to claim 1, wherein the gripping element is settable in its vertical distance from the translation adjustment unit.

7. The device according to claim 1, wherein the gripping element is movable relative to the translation adjustment unit in a direction that is in parallel to the axis of rotation of the first gripping arm.

8. The device according to claim 1, wherein the gripping element includes a quick change unit configured to receive a gripping tool via a quick-action closure.

9. The device according to claim 1, further comprising
a detection unit configured to determine from a sensor signal detection of the object to be gripped;
an electronic processing unit configured to receive detected object information from the detection unit and ascertain a relative position of the object to be gripped relative to the gripping arms; and
a control unit configured to control the movement of gripping arms relative to the object to grip the object based on the ascertained relative position.

10. The device according to claim 1, further comprising:
a fastening unit configured to fasten the device on a robot.

11. A method for gripping an object, comprising:
moving at least two gripping arms of at least three gripping arms held on a base element relative to the base element into a configuration at which the object may be gripped by the at least three gripping arms,
wherein a first gripping arm of the at least three gripping arms incudes a translation adjustment unit, a gripping element held on the translation adjustment unit, and an adjustment unit,
wherein the translation adjustment unit extends perpendicularly to an axis of rotation of the first gripping arm, and the gripping element is configured to be movable along a longitudinal extension direction of the translation adjustment unit, and
wherein the gripping element is configured to be moved toward or away from the translation adjustment unit via the adjustment unit; and
gripping the object with the at least three gripping arms, wherein the at least three gripping arms each are configured to be moved independently of one another relative to the base element.

\* \* \* \* \*